United States Patent
Brazier et al.

(10) Patent No.: US 6,431,196 B1
(45) Date of Patent: Aug. 13, 2002

(54) COMBINATION PRESSURE RELIEF DEVICE

(75) Inventors: Geof Brazier; Arnold Mundt, both of Tulsa, OK (US)

(73) Assignee: BS&B Safety Systems, Inc., Tulsa, OK (US)

( * ) Notice: Subject to any disclaimer, the term of this patent is extended or adjusted under 35 U.S.C. 154(b) by 0 days.

(21) Appl. No.: 09/545,090

(22) Filed: Apr. 7, 2000

(51) Int. Cl.[7] .................................................. F16L 55/18
(52) U.S. Cl. .............................. 137/15.01; 137/315.04; 137/68.18; 137/71
(58) Field of Search .................. 137/68.18, 71, 137/315.04, 15.01

(56) References Cited

U.S. PATENT DOCUMENTS

| | | | |
|---|---|---|---|
| 1,951,926 A | * 3/1934 | Davidson | 137/71 |
| 3,485,082 A | * 12/1969 | Myers | 137/71 |
| 3,897,799 A | * 8/1975 | Lee | 137/71 |
| 4,549,565 A | 10/1985 | Short, III | |
| 4,889,151 A | * 12/1989 | Oten | 137/71 |
| 5,644,930 A | 7/1997 | Albertson et al. | |

FOREIGN PATENT DOCUMENTS

| | | |
|---|---|---|
| DE | 1 000 197 B | 1/1957 |
| EP | 0 026 575 A | 4/1981 |
| GB | 2 028 426 A | 3/1980 |

OTHER PUBLICATIONS

"Valves and Accessories for Ammonia Refrigeration and Industrial Applications", *Henry Valve Company Catalog 211*, pp. 1–20, 1997.
"Valves and Accessories for Refrigeration and Air Conditioning Applications", *Henry Valve Company Catalog 113*, pp. 1–16, 1997.

* cited by examiner

*Primary Examiner*—A. Michael Chambers
(74) *Attorney, Agent, or Firm*—Finnegan, Henderson, Farabow, Garrett & Dunner, L.L.P.

(57) ABSTRACT

A pressure relief device with a permanently attached rupture disk is disclosed. The pressure relief device includes a valve body. The valve body includes an inlet and an outlet defining a flow passage therebetween. A valve mechanism is housed in the valve body and is movable between a closed position where it blocks the flow passage and an open position. A rupture disk configured to burst when exposed to a predetermined pressure is provided. The rupture disk is permanently attached to the valve body to prevent the pressurized fluid from flowing through the flow passage until it bursts. Permanently attaching the rupture disk to the valve body makes them a compact unit to be replaced and discarded together. The rupture disk may be permanently attached to the valve body by welding, soldering, brazing, crimping, or adhesive bonding.

44 Claims, 3 Drawing Sheets

COMBINATION PRESSURE RELIEF DEVICE

BACKGROUND OF THE INVENTION

This invention generally relates to devices for relieving pressure from a pressurized system. More particularly, the present invention relates to a pressure relief device that combines a rupture disk and a pressure relief valve.

Devices that combine a rupture disk and a pressure relief valve are commonly engaged with pressurized systems to provide a safety mechanism that prevents over-pressurization within the systems. In these types of devices, the rupture disk is connected to the pressure relief valve by a fluid passageway. The device is engaged with the pressurized system to expose the rupture disk to the pressurized fluid. The rupture disk, which is configured to burst when exposed to a predetermined fluid pressure, prevents the fluid from flowing through the fluid passageway and into contact with the pressure relief valve.

When the rupture disk bursts in response to a pressure change in the system, fluid flows through the passageway and into contact with the pressure relief valve. The pressure relief valve is similarly configured to open when exposed to a predetermined fluid pressure. Thus, the pressure of the fluid causes the pressure relief valve to open and relieve the system pressure. Typically, the pressure relief valve will reclose after the system pressure decreases sufficiently. By doing so, it prevents the system from losing its entire fluid content.

Combining a rupture disk with a pressure relief valve is advantageous over a pressure relief valve alone because the rupture disk prevents constant exposure of the pressure relief valve to the fluid. This extends the valve life by protecting valve parts from potentially corrosive fluids, permits in-service valve testing without the need to shutdown the system, and prevents the inadvertent release of the fluid by the valve under normal system operating conditions. In addition, it has been found that subjecting a pressure relief valve to constant pressure may affect the pressure at which the pressure relief valve opens and resets.

In the known rupture disk/pressure relief valve combinations, the rupture disk is connected to the pressure relief valve with a mechanical coupling. The rupture disk is typically held within the mechanical coupling using mechanical fasteners such as bolts, threads or pins. The mechanical coupling, in turn, attaches to the pressure relief valve by a threaded, flanged, pin, or bayonet fitting connection to complete a rupture disk/pressure relief valve combination.

One disadvantage of the conventional mechanical coupling to form a rupture disk/pressure relief valve combination is that the burst pressure of the rupture disk may shift if the mechanical fasteners are over-tightened. Furthermore, an over-tightened or under-tightened mechanical coupling may cause leakage past or through the rupture disk. To avoid an uncertainty in the burst pressure and possible leakage, considerable care and control need to be exercised when connecting the rupture disk to the pressure relief valve using mechanical fasteners. In fact, a good design practice results in enlarged dimensions that far exceed the nominal size of a threaded or flanged connection.

Another disadvantage of the conventional mechanical coupling is that the overall length of the combination pressure relief device may not be suitable for certain applications. For example, the space available on refrigeration systems to install the conventional rupture disk/pressure relief valve combination is often limited. Also, certain refrigeration systems, such as those in transportation and aviation applications, require a minimum mass to maximize the fuel efficiency and load-carrying capacity of the transportation vehicle. The mechanical coupling is undesirable in these applications because it adds to the overall length and mass of the combination.

Yet another disadvantage of the mechanical coupling is that the intended rupture disk/pressure relief valve combination can be disassembled, and thereby may lead to incorrect application and installation. For example, an operator may install the pressure relief valve without the rupture disk, or may install only the rupture disk and not the the pressure relief valve. In addition, an operator may improperly combine a rupture disk having a first set pressure with a pressure relief valve having a second, incompatible, set pressure. This would result in non-compliance with applicable code requirements and pose a risk to users of the system. Moreover, a rupture disk/pressure relief valve combination can be code-certified as a "combination device" with an increased flow capacity. Thus, it is desirable to retain the certified combination together for application and installation.

In light of the foregoing, there is a need for a rupture disk/pressure relief valve combination that (1) eliminates conventional mechanical fasteners that may affect the burst pressure and leak tightness of the rupture disk/pressure relief valve combination, (2) minimizes the overall length and mass of the combination device, (3) ensures that the system-required combination of rupture disk and pressure relief valve set pressures is integrated, and (4) enables the certified combination of rupture disk and pressure relief valve to remain together.

SUMMARY OF THE INVENTION

Accordingly, the present invention is directed to a pressure relief device that obviates one or more of the limitations and disadvantages of prior art pressure relief devices. The advantages and purposes of the invention will be set forth in part in the description which follows, and in part will be obvious from the description, or may be learned by practice of the invention. The advantages and purposes of the invention will be realized and attained by the elements and combinations particularly pointed out in the appended claims.

To attain the advantages and in accordance with the purposes of the invention, as embodied and broadly described herein, the invention is directed to a pressure relief device for a system containing a pressurized fluid. The pressure relief device includes a valve body. The valve body includes an inlet and an outlet defining a flow passage therebetween. A valve mechanism is housed in the valve body and is movable between a closed position where the valve mechanism blocks the flow passage and an open position. A rupture disk is permanently attached to the valve body to prevent the pressurized fluid from flowing through the flow passage until the rupture disk bursts.

In another aspect, the invention is directed to a method for preventing over-pressurization of a system. One of the steps for carrying out the method is providing a pressure relief device that includes a valve body having an inlet and an outlet defining a flow passage therebetween. A valve mechanism is housed in the valve body and is movable between a closed position where the valve mechanism blocks the flow passage and an open position. A rupture disk is permanently attached to the valve body to prevent a pressurized fluid from flowing through the flow passage. In accordance with the method, the pressure relief device is engageable with the system to prevent the pressurized fluid from flowing through the flow passage until the pressure within the system exceeds a predetermined level, thereby causing the rupture disk to burst.

In yet another aspect, the invention is directed to a method of manufacturing a pressure relief device. The method includes the step of providing a valve body that includes an inlet and an outlet defining a flow passage therebetween and has a valve mechanism movable between a closed position where the valve mechanism blocks the flow passage and an open position. The method also includes the step of providing a rupture disk that is configured to burst at a predetermined pressure. The rupture disk is permanently attached to the valve body to prevent a fluid from flowing through the flow passage until the rupture disk bursts.

It is to be understood that both the foregoing general description and the following detailed description are exemplary and explanatory only and are not restrictive of the invention, as claimed.

BRIEF DESCRIPTION OF THE DRAWING

The accompanying drawings, which are incorporated in and constitute a part of this specification, illustrate one embodiment of the invention and together with the description, serve to explain the principles of the invention. In the drawings.

DETAILED DESCRIPTION

Figure 2:
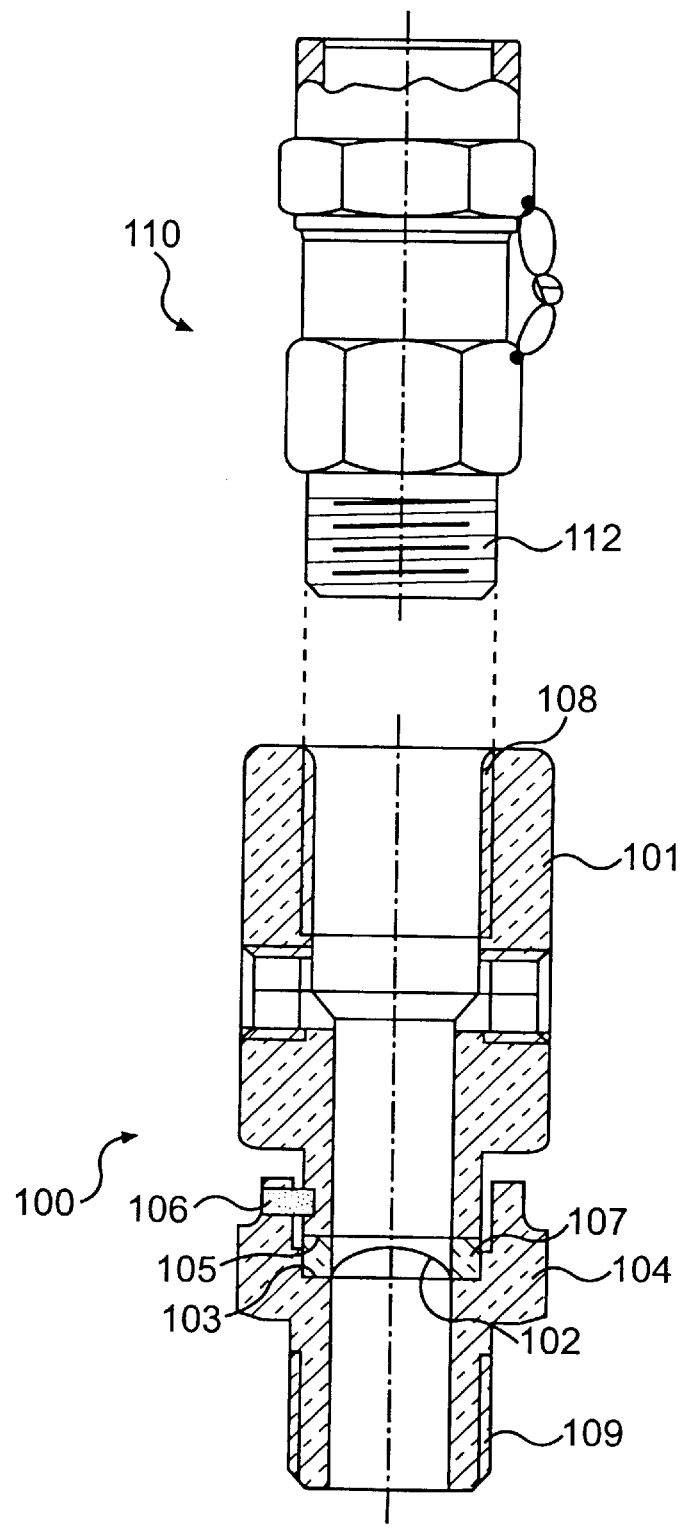
FIG. 2 is an exploded view of a prior art pressure relief device illustrating a mechanical coupling in a cross-sectional view and a pressure relief valve in a partial sectional view.

By way of background, FIG. 2 illustrates one common prior art pressure relief device that combines a rupture disk with a pressure relief valve. A mechanical coupling 100 includes an upper coupling 101 and a lower coupling 104. Upper coupling 101 includes a shoulder 105 and lower coupling 104 includes a corresponding shoulder 103. Rupture disk 102 is held between shoulders 103 and 105 by a screw-threaded connection (not shown) of upper coupling 101 and lower coupling 104. The screw-threaded connection of upper coupling 101 and lower coupling 104 is tightened in an attempt to provide a fluid-tight seal between mechanical coupling 100 and rupture disk 102. A slippage ring 107 is provided to avoid damage to rupture disk 102 as upper coupling 101 and lower coupling 104 are assembled. Pin 106 is installed to retain mechanical coupling 100 as a rupture disk assembly having the recommended assembly torque.

Mechanical coupling 100 is attached to a pressure relief valve 110 by mating female threads 108 on mechanical coupling 100 and corresponding male threads 112 on pressure relief valve 110. The threaded engagement forms a rupture disk/pressure relief valve combination. The threaded engagement makes the combination detachable without any physical damage to mechanical coupling 100 and pressure relief valve 110. The combination, in turn, is engaged with a system containing a pressurized fluid by mating threads 109 with corresponding threads disposed on a fitting associated with the pressurized system.

It is also a conventional practice to assemble rupture disk 102 between the inlet of pressure relief valve 110 and the outlet of mechanical coupling 100 by studs and nuts (not shown) connected through flanges (not shown).

Reference will now be made in detail to the presently preferred embodiment of the present invention, an example of which is illustrated in the accompanying drawings. Wherever possible, the same reference numbers will be used throughout the drawings to refer to the same or like parts. An exemplary embodiment of a pressure relief device of the present invention is shown in FIG. 1 designated generally by reference number 10.

In accordance with the present invention, there is provided a pressure relief device for a system containing a pressurized fluid. The pressure relief device includes a valve body having an inlet and an outlet defining a flow passage therebetween. The valve body is engageable with the system. A valve mechanism is housed in the valve body. The valve mechanism is movable between a closed position where the valve mechanism blocks the flow passage and an open position. The pressure relief valve further includes a rupture disk permanently attached to the valve body and configured to prevent the pressurized fluid from flowing through the flow passage until the rupture disk bursts.

Preferably, the rupture disk is permanently attached to the valve body by welding. However, the present invention contemplates that other attachments that make the rupture disk a permanent part of the valve body may be utilized, such as, for example, soldering, brazing, crimping or adhesive bonding. Unlike conventional mechanical attachments that use threads, bolts or pins, the permanently attached rupture disk is not detachable from the valve body without physical damage to either the rupture disk or the valve body. Thus, a permanent attachment makes the rupture disk and the valve body a unit to be replaced and discarded together. Also, the permanent attachment provides a permanent seal between the valve body and the rupture disk, unlike conventional mechanical attachments in which the seal may be broken by inadvertent under-tightening or over-tightening and intentional tampering.

Figure 1:
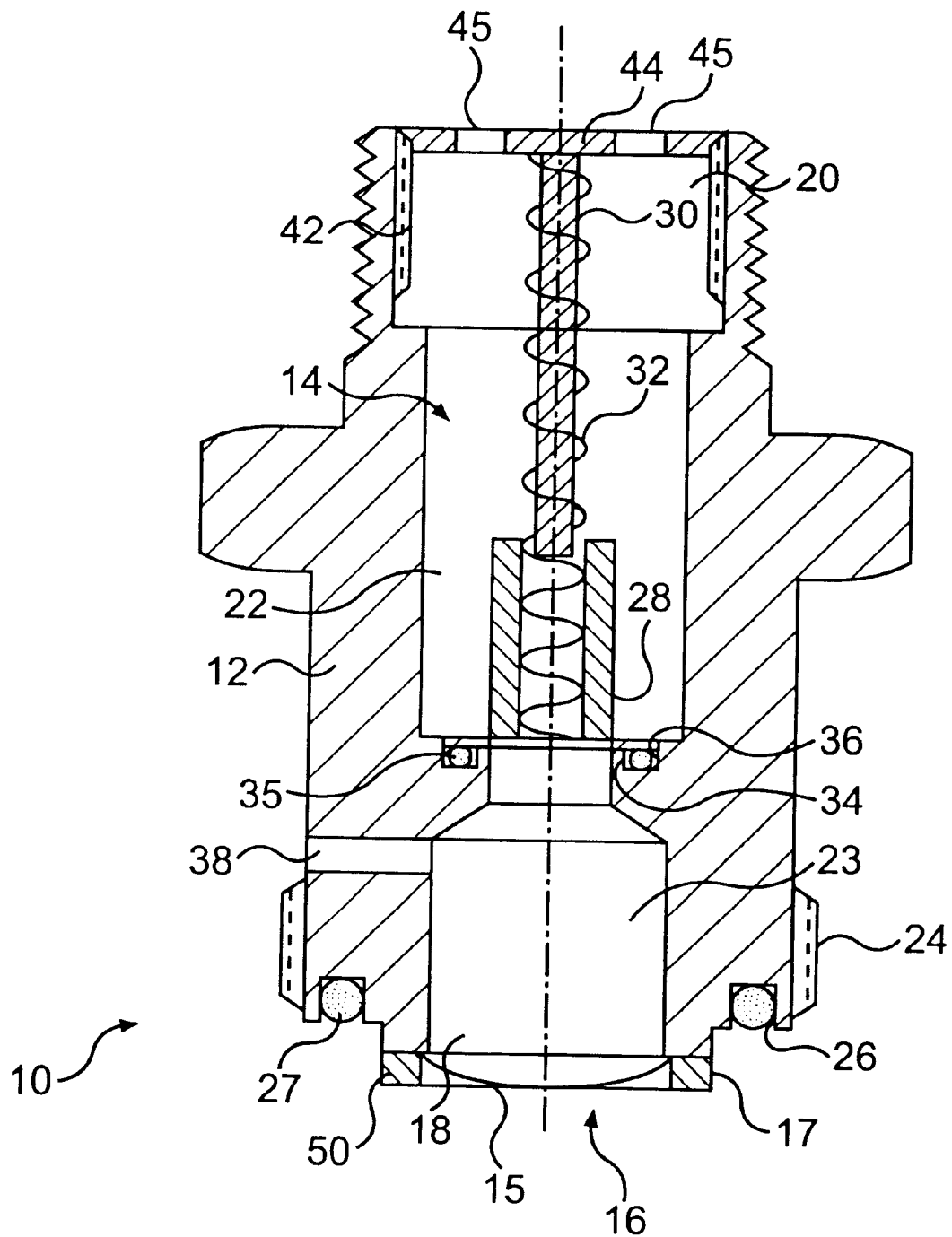
FIG. 1 is a cross-sectional view of a pressure relief device according to the present invention, illustrating a plug in a closed position.

Referring to FIG. 1, a pressure relief device 10 includes a valve body 12, a valve mechanism 14 and a rupture disk 16. A flow passage 22 is formed inside valve body 12 between an inlet 18 and an outlet 20. Valve body 12 is engageable with a system (not shown) containing a pressurized fluid. Preferably, valve body 12 includes threads 24 provided on its outer surface that are configured to engage with corresponding threads on the pressurized system. The present invention contemplates that either parallel or tapered threads may be used.

A groove 26 is provided on the inlet surface of valve body 12 to contain a sealing member such as an o-ring 27. When threads 24 engage corresponding threads (not shown) in the system, the sealing member in groove 26 engages a surface of the pressurized system. This engagement provides a fluid-tight connection between pressure relief device 10 and the system (not shown) to prevent any leakage of the pressurized fluid. However, it should be noted that no groove 26, and thereby no o-ring 27, needs to be provided if tapered threads are used instead of parallel threads. Tapered threads alone or tapered threads with the aid of thread sealant material are sufficient for a fluid-tight connection between pressure relief device 10 and the system.

As illustrated in FIG. 1, valve mechanism 14 is housed in valve body 12. Valve mechanism 14 includes a plug 28 that is movable between a closed position and an open position.

In the closed position, plug 28 engages a valve seat 34 provided on valve body 12 to prevent fluid from flowing through flow passage 22 to outlet 20. Preferably, an o-ring 35 is provided within a groove 36 for a fluid-tight sealing engagement between plug 28 and valve seat 34.

As also shown in FIG. 1, a spring 32 surrounds a valve stem 30 and is disposed to bias plug 28 toward the closed position. Preferably, spring 28 is selected to exert a particular force on plug 28 to maintain the plug in the closed position until a predetermined pressure is exerted on plug 28. When the predetermined pressure is reached, the fluid force will overcome the biasing force of spring 32 and move plug 28 to an open position. When plug 28 is in the open position, fluid may flow from the system through outlet 20 to relieve the pressure in the system. When enough fluid has escaped the system, such that the system pressure drops below the predetermined pressure, the force of spring 32 will move plug 28 to the closed position.

Referring again to FIG. 1, rupture disk 16 includes a flange 17 and a rupturable portion 15. Flange 17 is permanently attached to valve body 12 to position rupturable portion 15 in flow passage 22. Rupturable portion 15 prevents the pressurized fluid in the system from flowing through a flow passage 23. Preferably, flange 17 is welded to valve body 12 at inlet 18. The present invention, however, contemplates that rupture disk 16 may be welded to any part of valve body 12 in flow passage 23 as long as the pressurized fluid is prevented from exerting a pressure on plug 28 until rupture disk 16 bursts in response to a predetermined pressure. The present invention further contemplates permanent attachments other than by welding that make rupture disk 16 a permanent part of valve body 12 so that rupture disk 16 and valve body 12 become a unit to be replaced and discarded together.

Preferably, rupture disk 16 is a reverse-buckling, non-fragmentary type. Upon bursting in response to a predetermined pressure, a non-fragmentary rupture disk does not produce any fragments that may be lodged between valve body 12 and valve mechanism 14. Thus, the use of a non-fragmentary rupture disk eliminates plug 28 reseating problems that may result from rupture disk fragments.

Referring to FIG. 1, valve body 12 further includes a bore 38. Threads 24 are disposed below bore 38 so that bore 38 is exposed when valve body 12 is engaged with the system. Alternatively, the present invention contemplates threads 24 disposed above bore 38. Bore 38 then aligns with a corresponding bore (not shown) in the system when threads 24 engage valve body 12 with the system. Bore 38 is typically configured to receive a pressure gauge (not shown). Preferably, bore 38 is positioned between rupture disk 16 and plug 28 so that the pressure gauge measures the pressure exerted on valve mechanism 14. A positive pressure indicated on the pressure gauge is a signal to replace pressure relief device 10. The present invention contemplates that a pressure switch (not shown) may be used in addition to, or in place of the pressure gauge, to generate an electrical signal to alert the system operator or to trigger automated controls.

Referring again to FIG. 1, under normal operating conditions, valve mechanism is 14 housed in valve body 12 in the closed position. Plug 28 engages valve seat 34 in a fluid-tight manner by the biasing force provided by spring 32. A threaded cap 44 with openings 45 is secured by the engagement with internal threads 42 to retain valve mechanism 14 at the appropriate spring loading. Once cap 44 is secured, a tamper-proof seal (not shown) is affixed between cap 44 and valve body 12. After valve mechanism 14 is provided in valve body 12, rupture disk 16 is permanently attached to valve body 12. Alternatively, the present invention contemplates permanently attaching rupture disk 16 before providing valve mechanism 14 in valve body 12. Preferably, rupture disk 16 is permanently attached to valve body 12 by welding although other permanent attachments, such as soldering, brazing, crimping, or adhesive bonding, are contemplated by the present invention.

Preferably, a ring 50 is welded to the inlet side of rupture disk flange 17. Ring 50 is configured to protect rupture disk 16 from physical damages that may result during pre-installation storage and shipping.

Figure 3:
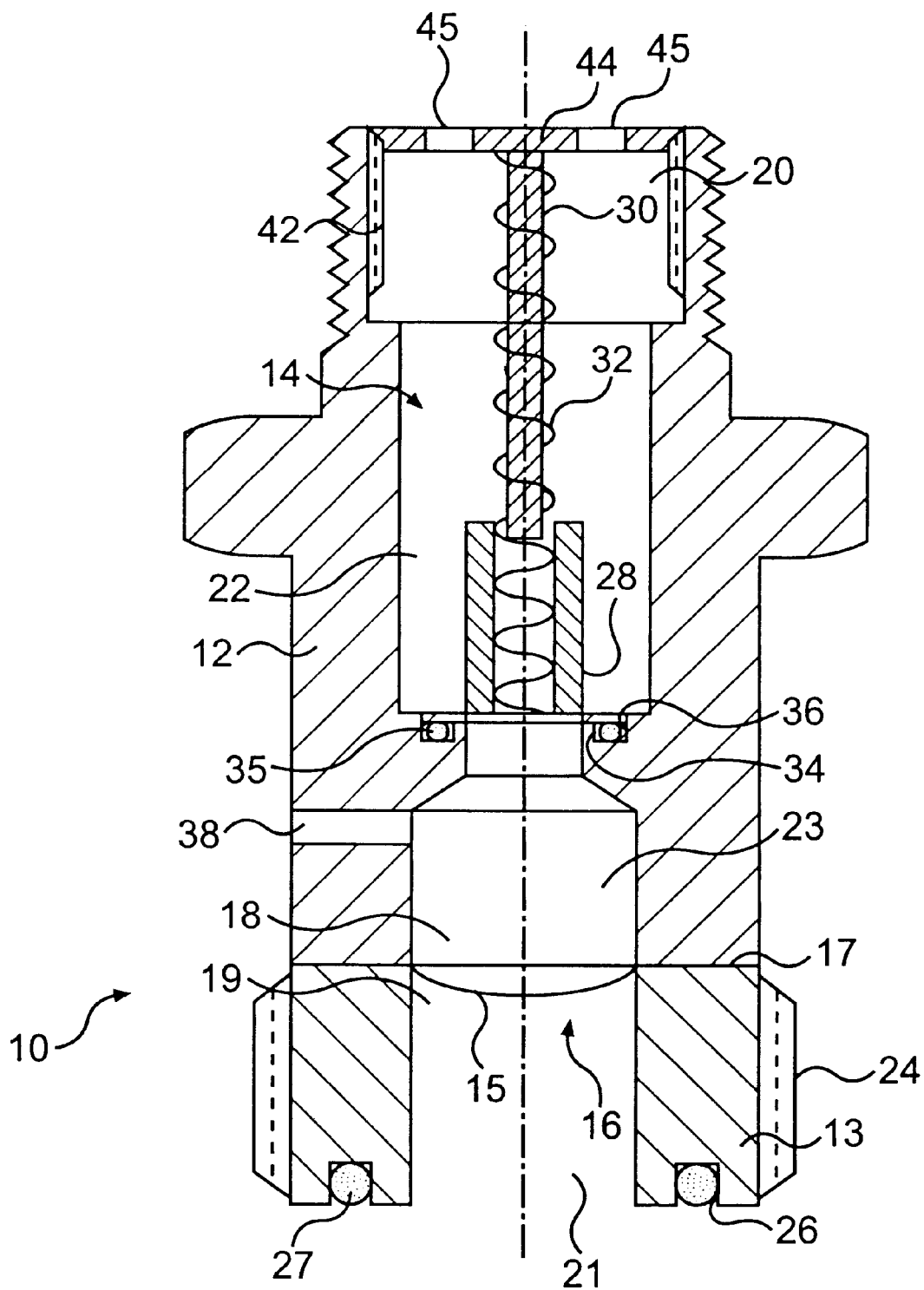
FIG. 3 is a cross-sectional view of a pressure relief device according to the present invention, illustrating a housing attached to a valve body.

FIG. 3 illustrates an alternative embodiment of pressure relief device 10. A housing 13 is provided in addition to valve body 12, valve mechanism 14 and rupture disk 16. Housing 13 includes a housing inlet 21 and a housing outlet 19. Threads 24 are provided on the outer surface of housing 24 to engage a corresponding threads on a pressurized system. Thus, housing 13 engages the pressurized system and leaves valve body 12 exposed outside the pressurized system. As previously mentioned, either parallel or tapered threads may be used.

Housing 13 as well as rupture disk 16 is permanently attached to valve body 12 to prevents the pressurized fluid in the system from flowing through flow passage 23. Preferably, housing 13 and rupture disk 16 are welded to valve body 12 at inlet 18. The present invention, however, contemplates other permanent attachments, such as soldering, brazing, crimping, or adhesive bonding, that make rupture disk 16, valve body 12, and housing 13 a permanent unit to be replaced and discarded together.

The operation of the aforementioned pressure relief device will now be described with reference to the attached drawings.

Referring to FIG. 1, an assembled pressure relief device 10 is engaged with a system (not shown) containing a pressurized fluid by mating threads 24 provided on the outer surface of valve body 12 with corresponding threads on a system fixture. A sealing member, such as an o-ring, provided in groove 26 makes a fluid-tight seal with the system if parallel threads are used. As previously mentioned, no groove 26, and thereby no o-ring, needs to be provided if tapered threads are used instead of parallel threads. As pressure relief device 10 engages the system, bore 38 is exposed outside the system. Alternatively, bore 38 may aligns with a corresponding bore (not shown) in the system if bore 38 is disposed above threads 24. A pressure gauge is engaged with bore 38 to monitor the pressure exerted on valve mechanism 14. As previously mentioned, a pressure switch may be used in addition to, or in place of the pressure gauge to generate an electrical signal to alert the system operator or to trigger automated controls.

As discussed previously, the pressure relief device 10 is configured so that the pressurized fluid exerts no pressure on valve mechanism 14 under normal operating conditions. The pressure gauge engaged with bore 38 will therefore initially indicate a zero pressure. However, if a leak develops through rupture disk 16, past rupture disk 16, or rupture disk 16 bursts, the pressure gauge connected to bore 38 will indicate the positive system pressure on plug 28. This will alert maintenance personnel to replace pressure relief device 10. Any fluid leakage through rupture disk 16 is potentially damaging to the physical integrity of the system because it creates a back pressure between rupture disk 16 and plug 28. Because rupture disks are differential pressure sensitive devices, the back pressure will prevent rupture disk 16 from bursting at the required overpressure, and will thereby jeopardize the physical integrity of the system should the system pressure increases while the back pressure acts against the rupture disk.

As long as there is no pressure between rupture disk 16 and plug 28, the valve mechanism experiences no pressure until rupture disk 16 bursts in response to an increase in the system pressure. Preferably, rupture disk 16 is selected to burst at a predetermined pressure that is selected to protect the physical integrity of the system. More preferably, the predetermined pressure at which rupture disk 16 bursts is substantially the same as the predetermined pressure at which valve mechanism 14 opens to relieve an excess pressure from the system. This ensures that the opening of valve mechanism 14 immediately follows the bursting of rupture disk 16 without any significant time delay. When the system pressure decreases below the predetermined pressure as a result of the pressurized fluid escaping from the system, spring 32 moves valve mechanism 14 to its closed position shown in FIG. 1. It should be noted that although valve mechanism 14 recloses as the system pressure decreases, plug 28 may not always reestablish a fluid-tight seal with valve seat 34. Dirt and foreign matters accumulated on valve seat 34 during the pressurized fluid discharge may cause a resealing problem. Consequently, while reclosing may decrease the rate of discharge, it may not necessarily stop the discharge completely. Therefore, pressure relief device 10 should be replaced as soon as possible after the discharge to ensure that the system does not lose all its fluid content. A prompt replacement of pressure relief device 10 is especially important in all systems containing hazardous, or costly fluids, and in all systems where loss of fluid will impair their subsequent operations.

It will be apparent to those skilled in the art that various modifications and variations can be made in the device of the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of manufacturing a pressure relief device, the method comprising steps of:
   providing a valve body including an inlet and an outlet defining a flow passage therebetween and having a valve mechanism movable between a closed position where the valve mechanism blocks the flow passage and an open position;
   providing a rupture disk configured to prevent a fluid from flowing through the flow passage and configured to burst when exposed to a predetermined pressure; and
   permanently attaching the rupture disk to the valve body so that the rupture disk and the valve body are not detachable from each other without physical damage to at least one thereof and the rupture disk and the valve body become a unit to be replaced together.

2. The method of claim 1, wherein the rupture disk is a non-fragmentary type.

3. The method of claim 1, wherein the rupture disk is permanently attached to the valve body by welding.

4. The method of claim 3, wherein the rupture disk includes a flange and the flange is welded to the valve inlet.

5. The method of claim 1, wherein the rupture disk is permanently attached to the valve body by soldering.

6. The method of claim 1, wherein the rupture disk is permanently attached to the valve body by brazing.

7. The method of claim 1, wherein the rupture disk is permanently attached to the valve body by crimping.

8. The method of claim 1, wherein the rupture disk is permanently attached to the valve body by adhesive bonding.

9. The method of claim 1, further comprising the steps of:
   providing a housing having a housing inlet and a housing outlet; and
   permanently attaching the housing to the valve body.

10. The method of claim 9, wherein the rupture disk is positioned between the valve inlet and the housing outlet.

11. The method of claim 9, wherein the housing is permanently attached to the valve body by welding.

12. The method of claim 9, wherein the housing is permanently attached to the valve body by soldering.

13. The method of claim 9, wherein the housing is permanently attached to the valve body by brazing.

14. The method of claim 9, wherein the housing is permanently attached to the valve body by crimping.

15. The method of claim 9, wherein the housing is permanently attached to the valve body by adhesive bonding.

16. A pressure relief device for a system containing a pressurized fluid, comprising:
   a valve body having an inlet and an outlet defining a flow passage therebetween;
   a valve mechanism housed in the valve body and movable between a closed position where the valve mechanism blocks the flow passage and an open position;
   a rupture disk configured to prevent the pressurized fluid from flowing through the flow passage until the rupture disk bursts; and
   means for permanently attaching the rupture disk to the valve body so that the rupture disk and the valve body are not detachable from each other without physical damage to at least one thereof and the rupture disk and the valve body become a unit to be replaced together.

17. The device of claim 16, wherein the rupture disk prevents the pressurized fluid from exerting any pressure on the valve mechanism until the rupture disk bursts.

18. The device of claim 16, wherein the rupture disk is configured to burst in response to a predetermined pressure exerted thereon.

19. The device of claim 16, wherein the valve mechanism is configured to move from the closed position to the open position when a predetermined pressure is exerted on the valve mechanism.

20. The device of claim 19, wherein the pressure relief device further includes a spring acting on the valve mechanism to move the valve mechanism to the closed position when the pressure of the pressurized fluid drops below the predetermined pressure.

21. The device of claim 16, wherein the valve body includes a bore configured to receive a pressure gauge.

22. The device of claim 21, wherein the bore is positioned to allow the pressure gauge to measure a pressure exerted on the valve mechanism.

23. The device of claim 16, wherein the valve body is engageable with the system.

24. The device of claim 23, wherein the valve body includes parallel threads configured to engage the valve body with the system.

25. The device of claim 24, wherein the valve body includes a groove configured to receive a sealing member.

26. The device of claim 23, wherein the valve body includes tapered threads configured to engage the valve body with the system.

27. The device of claim 16, wherein the rupture disk is a non-fragmentary type.

28. The device of claim 16, wherein the means for permanently attaching the rupture disk is a weld.

29. The device of claim 28, wherein the rupture disk includes a flange and the flange is welded to the valve inlet.

30. The device of claim 16, wherein the means for permanently attaching the rupture disk is solder.

31. The device of claim 16, wherein the means for permanently attaching the rupture disk is a braze.

32. The device of claim 16, wherein the means for permanently attaching the rupture disk is a crimp.

33. The device of claim 16, wherein the means for permanently attaching the rupture disk is an adhesive bond.

34. The device of claim 16, further comprising a housing permanently attached to the valve body, the housing having a housing inlet and a housing outlet.

35. The device of claim 34, wherein the rupture disk is positioned between the valve inlet and the housing outlet.

36. The device of claim 34, wherein the housing is engageable with the system.

37. The device of claim 36, wherein the housing includes parallel threads configured to engage the valve body with the system.

38. The device of claim 37, wherein the housing includes a groove configured to receive a sealing member.

39. The device of claim 36, wherein the housing includes tapered threads configured to engage the valve body with the system.

40. The device of claim 34, wherein the housing is permanently attached to the valve body by welding.

41. The device of claim 34, wherein the housing is permanently attached to the valve body by soldering.

42. The device of claim 34, wherein the housing is permanently attached to the valve body by brazing.

43. The device of claim 34, wherein the housing is permanently attached to the valve body by crimping.

44. The device of claim 34, wherein the housing is permanently attached to the valve body by adhesive bonding.

* * * * *